United States Patent [19]

Gurley et al.

[11] 4,227,215
[45] Oct. 7, 1980

[54] TELEVISION PICTURE POSITIONING APPARATUS

[75] Inventors: Thomas M. Gurley, Maple Shade; Robert S. Hopkins, Jr., Marlton; Wolf-Dieter Fischer, Turnersville, all of N.J.

[73] Assignee: RCA Corporation, New York, N.Y.

[21] Appl. No.: 862,178

[22] Filed: Dec. 19, 1977

[30] Foreign Application Priority Data

Mar. 21, 1977 [GB] United Kingdom .............. 11905/77

[51] Int. Cl.³ .................... H04N 5/14; H04N 5/04
[52] U.S. Cl. ........................ 358/160; 358/148
[58] Field of Search ............ 358/22, 148–150, 358/151–152, 160, 180–183; 340/724, 733

[56] References Cited

U.S. PATENT DOCUMENTS

| Re. 28,598 | 10/1975 | Baer et al. ............ 340/724 X |
|---|---|---|
| 3,740,743 | 6/1973 | Baron .................. 340/724 X |
| 3,758,712 | 9/1973 | Hudson ................. 358/183 |
| 3,781,849 | 12/1973 | Baron et al. .......... 340/733 X |
| 3,781,850 | 12/1973 | Gicca et al. .......... 340/733 X |
| 3,793,483 | 2/1974 | Bushnell .............. 358/148 |
| 3,835,245 | 9/1974 | Pieters ............... 340/733 X |
| 3,984,633 | 10/1976 | Rutt et al. ........... 358/183 X |
| 4,089,524 | 5/1978 | Hauck ................. 340/724 X |
| 4,099,205 | 7/1978 | Hatton et al. ......... 358/149 |
| 4,142,180 | 2/1979 | Burson ................ 340/724 X |
| 4,163,249 | 7/1979 | Michael et al. ........ 358/22 X |

OTHER PUBLICATIONS

"A Digital Frame Store Synchronizer", Matley, Journal of SMPTE, Jun. 76, vol. 85, No. 6, pp. 385–387.
"Digital Frame Storage for Television Video", Pursell & Newby, Journal of SMPTE, Apr. 74, vol. 83, pp. 300–302.
"Television Frame Synchronizer", Kano et al., Journal of SMPTE Mar. 75, vol. 84, pp. 129–134.

Primary Examiner—James W. Moffitt
Assistant Examiner—Aristotelis M. Psitos
Attorney, Agent, or Firm—Eugene M. Whitacre; Paul J. Rasmussen; Robert L. Troike

[57] ABSTRACT

Apparatus which when implemented with a television video synchronizer permits the operator to position the synchronized picture at any desired location of the television raster including off the screen. A typical synchronizer includes a memory address generator for providing addresses to the memory for each active picture sample following sync timing and the video signals are stored in a predetermined nonvarying location in such a way that reading the stored video out of the memory reproduces the video signal. The positioning by the apparatus is achieved by modifying the storage addresses so that the relationship between sync timing and picture timing is changed.

8 Claims, 6 Drawing Figures ically combined through reading out in different sequences. It allows positioning of the pictures on a monitor at any location of the raster including off the screen.

TELEVISION PICTURE POSITIONING APPARATUS

BACKGROUND OF THE INVENTION

This invention relates to the positioning of a synchronized picture at any desired location of the television raster including off the screen. This invention, more particularly, relates to such television positioning apparatus used with a television video synchronizer which is normally used for synchronizing the television signals.

These synchronizers have been introduced to synchronized broadcast sources to a local reference generator. A video synchronizer is an electronic unit that samples the analog input, converts it to a digital format, stores the digital data and operates on the digital data to deliver a desired analog output which is constructed from the sampled video. It is designed to automatically lock a nonsynchronous broadcast signal to a local reference generator and thus allow fully synchronous treatment of the incoming video for mixing the station programs. The nonsynchronous signal is digitized and stored in a memory. The input video signals are temporarily stored in the digital memory in predetermined nonvarying locations as prescribed by addresses from an address generator in such a way that reading the stored video out of the memory produces a video signal identical to the input video signal with the exception being that the timing of the output video is locked to the studio reference. The data is clocked out of the memory at a rate locked to the reference sync generator (usually the local station). This synchronizer isolates the input/output video lines and the output is fully synchronous in vertical, horizontal and color phases with the reference.

These video synchronizers make possible many special effects for relatively low additional cost. In a separate application entitled, "Television Picture Size Altering Apparatus" U.S. Pat. No. 4,134,128, filed Dec. 27, 1976, Robert N. Hurst describes the special effect of expansion or compression of the video by adding or eliminating samples stored in the digital memory. In a separate application entitled, "Television Picture Compressor" Ser. No. 862,180, filed Dec. 19, 1977, there is described a particular technique for reducing the size of a full frame or full field picture to a one-quarter size. Applicant's invention herein relates to the special effect of moving the reduced size or full size pictures on the displayed output.

SUMMARY OF THE INVENTION

An apparatus for moving the position of the pictures on the raster is provided. The apparatus is adapted for use with a video synchronizer of the type comprising means including an address generator responsive to television video for sampling same and storing the samples in nonvarying locations according to predetermined addresses from the generator and means responsive to the stored samples for providing a picture like that of the incoming television video. The apparatus senses the incoming video sync timing and provides moving of the picture by altering the storage addresses from the address generator.

DESCRIPTION OF THE INVENTION

Figure 1:
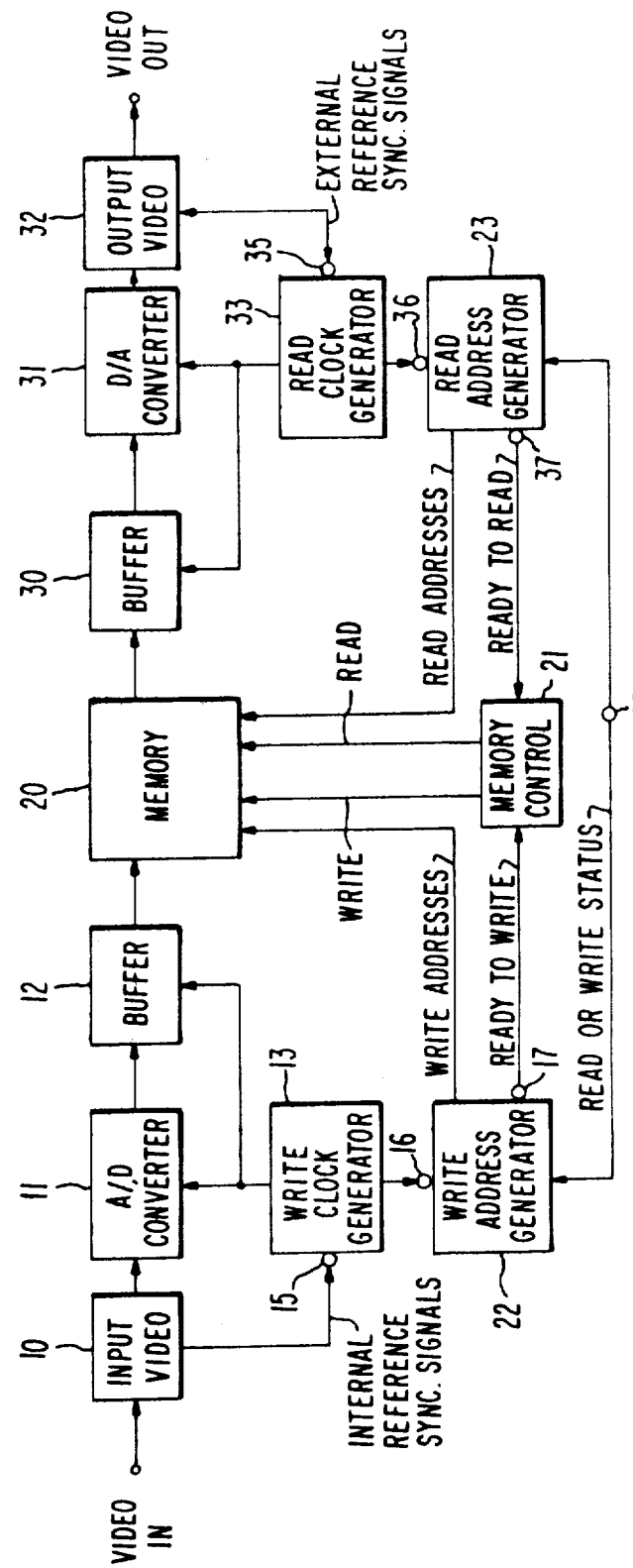
FIG. 1 is a block diagram of a television video synchronizer.

Referring to FIG. 1, a signal (Video In) from a non-synchronous source, such as an Electronic Journalism (EJ) camera, is coupled to an input terminal of a video synchronizer and applied to an input video processor 10 in which the incoming video signal synchronizing components and burst timing information are separated from the active picture information. The separated timing information is coupled to a write clock generator 13 which develops timing information in the form of 14.3 MHz pulses (four times the NTSC subcarrier frequency of 3.58 MHz), synchronous with the incoming signal timing information, for enabling an analog-to-digital (A/D) converter 11, buffer 12 and write address generator 22. The active picture information portion of the incoming video signal is bandwidth limited to 5.5 Mhz in the input video processor 10 and coupled from the output terminal of video processor 10 to the input terminal of A/D converter 11, of known form, where the signal is converted (sampled at a 14.3 Mhz word rate) into digital form consisting of 8-bit parallel code words.

Figure 2:
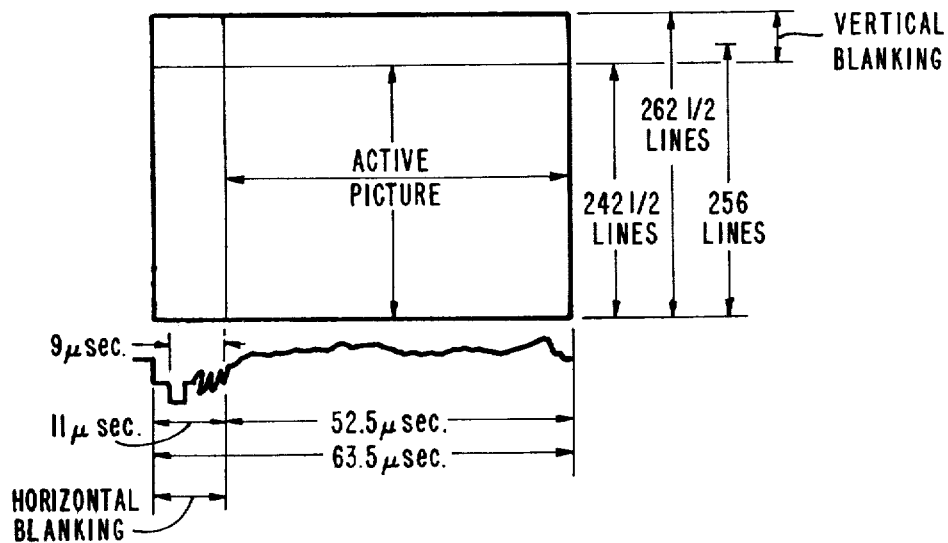
FIG. 2 illustrates in graphical form typical television line and field standards useful for understanding of the invention.

The signal output of A/D converter 11, in the form of a digitally sampled input video signal, is coupled to a buffer 12 and, in turn, to picture memory 20 for storage. The digital picture information signal is stored at discrete locations in the memory in accordance with specific address codes referenced to burst, vertical and horizontal sync signals generated by the write address generator 22 in response to the related incoming signal timing information generated in the write address clock. In a typical synchronizer of the type illustrated in FIG. 1, constructed in accordance with known techniques and utilizing a clock rate of 14.3 MHz, each horizontal line period of 910 samples would be 63.5 microseconds. See FIG. 2. As illustrated in FIG. 2, the active picture area actually comprises 242½ lines with the other 20 lines being utilized for the vertical blanking interval. To completely store the 242½ active vertical picture information lines per field as well as the vertical interval signal processing information on lines 17, through 20, 256 lines are stored beginning the vertical line information storage at line 15.

The data stored in memory 20 is read out of memory into a buffer 30, which is, in turn, coupled to a digital-to-analog (D/A) converter 31, which converts the 8-bit code word back to a conventional analog picture by timing information and read address generated by read clock generator 33 and read address generator 23, which are synchronized to the local studio reference. The output of D/A converter 31 is coupled to an output video processor 32 in which the blanking interval, sync and burst corresponding to local studio reference are added to the recovered picture information to restore the output video signal to a complete composite video signal, as illustrated in FIG. 2. Thus, the picture information, which is stored in memory 20 from a nonsynchronous source is read out of the memory synchronous with the local studio reference, which makes the signal suitable for programming production requirements of mixing, special effects and switching similar to the manner in which a live camera, VTR tape or other source is used.

Memory control 21 completes the synchronizer of FIG. 1 and includes logic circuitry which responds to status signals from the write and read address generators identified in FIG. 1 as ready-to-write and read-to-read, respectively, so as to provide write and read signals to memory 20 to insure that reading and writing into the same address location does not occur simultaneously as would be the case where nonsynchronous video sources may drift ahead and behind the fixed local stuido reference. A particular memory control circuit and a more detailed description of the synchronizer of FIG. 1 is described in application of Robert S. Hopkins, Jr., U.S. Pat. No. 4,134,131, entitled "Digital Video Synchronizer", filed Dec. 30, 1976.

A particularly advantageous memory storage construction useful in a television signal synchronizer of the form illustrated in FIG. 1 is known as a coherent memory and is described in detail in the application of R. A. Dischert, et al., assigned to the same assignee and filed Dec. 30, 1976 and given U.S. Pat. No. 4,101,926 entitled "Television Synchronizing Apparatus". Using the coherent memory as described in the above cited application of Dischert, et al., the time period of each line during which information is to be stored is reduced to 52.5$\mu$ sec corresponding to the actual video image portion of the line, as illustrated in FIG. 2. Utilizing the same clock rate of 14.3 MHz, as previously described, the number of samples per line to be stored is reduced from 910 to 768. Particularly advantageous ways of providing of coherence of the image information is discussed in copending application of Hopkins, et al., entitled, "Memory Read/Write Organization For a Television Signal Processor" filed Dec. 30, 1976 and given U.S. Pat. No. 4,109,276. The synchronizer described is similar to that of RCA type TFS-121 sold by RCA Broadcast Systems, Camden, N.J. Other types of video synchronizers which store whole frames are described in several articles in SMPTE Journal. See Volume 82 of SMPTE Journal, page 300 thru 302, entitled "Digital Frame Storage for Television Video" by Scott Pursell and Harold Newby, Volume 84 of SMPTE Journal, pages 129 thru 134, entitled "Television Frame Synchronizer" by Kano, et al., and Volume 85 of SMPTE Journal, No. 6, June 1976, pages 385 thru 388, entitled "A Digital Framestore Synchronizer" by J. Brian Matley.

Figure 3:
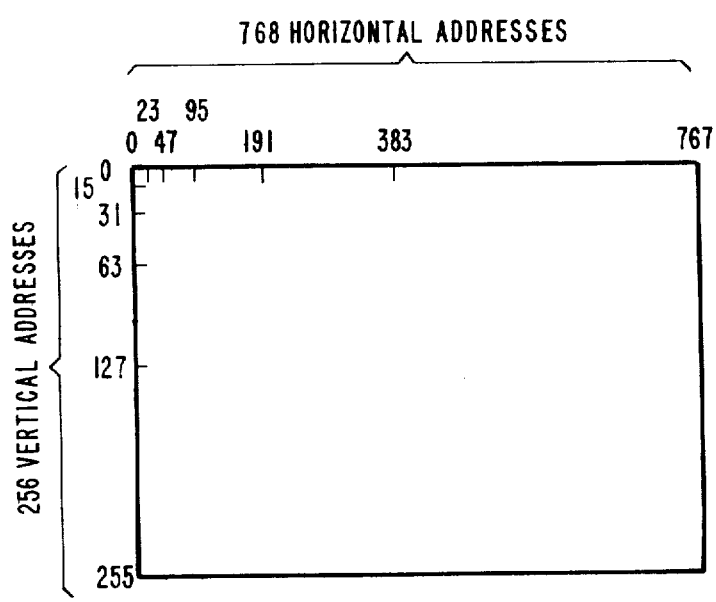
FIG. 3 illustrates the relationship between the horizontal and vertical addresses and the picture monitor location.

Shown in FIG. 3 is a digram illustrating memory addresses in the synchronizer as a function of position in the raster, as seen on a picture monitor. Shown for simplicity is only one of the television fields. In the synchronizer discussed here, there are 768 different addresses, or picture elements, in each horizontal line and 256 different horizontal line addresses in each field.

In implementing this invention, it is assumed, although not necessarily so, that only the active portion (See FIG. 2) of the video is stored. It is further assumed that the digital video will be read from the memory in such a manner that vertical address 0 occurs during line 15 (see previous discussion) of the output video (again this is not necessarily so but is used as an example) and that horizontal address 0 occurs at the point of the termination of horizontal blanking of the output video (again not necessarily so). With a 4 times subcarrier sampling clock (4×SC) horizontal address 767 will be approximately located at the termination of the active picture horizontal line.

In the normal synchronizing mode of operation, the input video will be stored in a manner identical to that described for reading the memory except timing references of line 15 and the end of horizontal blanking refer to the input video rather than the output video. The circuitry incorporated in the basic synchronizer will guarantee that the horizontal address is set to 0 at the termination of horizontal blanking and is incremented by 1 with each and every clock pulse during every horizontal line. Likewise, the circuitry will guarantee that the vertical address is set to 0 on line 15 and is incremented by 1 each and every horizontal blanking interval. These processes occur simultaneously and independently for writing into the memory and reading from the memory. For example see FIG. 4.

Figure 4:
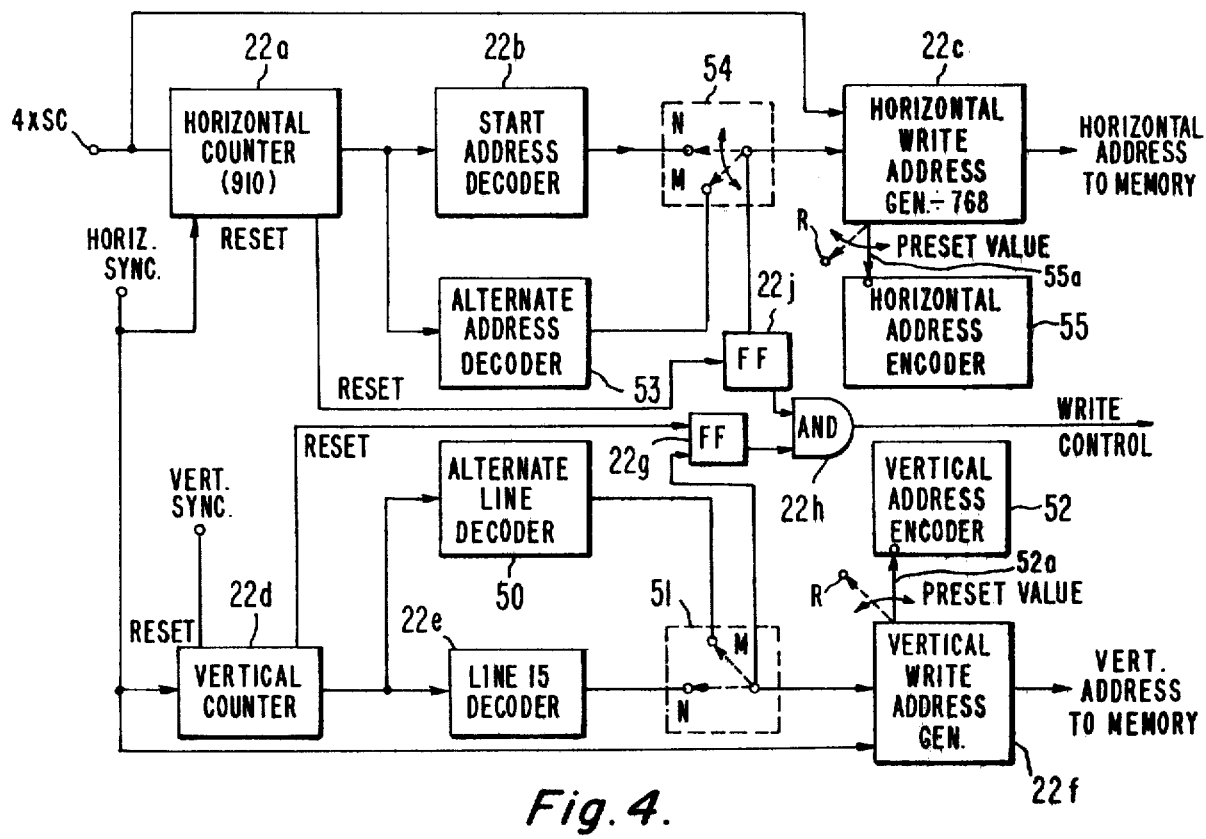
FIG. 4 is a block diagram of one implementation of the present invention for moving the picture right to left and up and down.

The write address generator of a typical synchronizer of the type in FIG. 1 would include, for example, a first horizontal counter 22a as illustrated in FIG. 4 wherein a 4×SC (four times subcarrier) clock signal from write clock generator 13 is applied to horizontal counter 22a and horizontal write address counter 22c. The horizontal counter 22a repeats every 910 samples which is slaved to the leading edge of each received horizontal sync pulse. The start address decoder 22b detects a "start" signal where the left edge of the normal active picture appears and applies this start signal to counter 22c and to flip-flop 22j. The flip-flop 22j in response to the "start" signal changes state and provides an enable to AND gate 22h. This start signal occurs for the example 9 microseconds after the leading edge of horizontal sync pulses (See FIG. 2). The horizontal write address counter 22c is clocked by the same 4×SC clock pulses to increment the addresses but remains "off" or inhibited until the "start" signal from start address decoder 22b is applied thereto whereupon it begins to count starting from address 0 and is incremented by one with each and every clock pulse during every horizontal line. The flip-flop 22j is reset at the end of each horizontal line by a signal from counter 22a.

Similarly, as illustrated in FIG. 4, the typical synchronizer of FIG. 1 includes a vertical address generator which is set to zero for the example on line 15. A first vertical counter 22d is responsive to the leading edge of the vertical sync from the write clock generator for resetting the counter 22d for counting the incoming horizontal sync pulses from the write clock generator pulses (lines). A line 15 decoder 22e is responsive to the line 15 count from the vertical counter 22d for providing a "start" signal to the vertical address counter or generator 22f to enable vertical addresses starting at 0 for the example on line 15 and to allow the vertical address counter 22f to be incremented by one each and every blanking interval thereafter. The write control signal out of AND gate 22h is enabled by the "start" signal being applied to flip-flop 22g which in turn applies the enable to AND gate 22h. The start address decoder 22b and line 15 decoder therefore detect the picture area to be stored in the memory to provide a "start" signal which enable AND gate 22h to provide a write control pulse to memory and to start incrementing the addresses.

To implement this invention, these processes are modified slightly when writing into the memory but are unaltered for reading from the memory. To cause the picture to be raised by one horizontal line, rather than starting the vertical address at 0 on line 15, it is set to 0 on line 16. To cause the picture to be raised by 10 horizontal lines, the vertical address is set to 0 on line 25. Video that occurred between line 15 and line 25 is automatically deleted. In general, to raise the picture by n lines requires setting the vertical address to 0 on line 15+n. To illustrate how the picture is raised, consider the case of lifting the picture 10 lines. Video from the 25th line is stored in vertical address 0. When reading this video from the memory, it will be displayed on line 15, 10 lines higher up on the output monitor. To accomplish this delay, an alternate line decoder 50 is coupled via a switch 51—switched from the normal "N" position to the "M" or modified position—between the vertical counter 22d and vertical write address generator (a counter) 22f. The alternate line decoder 50 for the above example when switch 51 is in the M position would count to 25 lines rather than 15 lines before applying the "start" signal to the vertical write address 22f and to flip-flop 22g providing an enabling signal to AND gate 22h. The write control signal would thereby be inhibited until line 25. The first 25 lines would be omitted from the memory and the input on line 25 would output on line 10 and the effect would be when read out that the picture would be raised 10 lines. The flip-flop 22g is reset when a whole field of horizontal sync pulses have been applied to vertical counter 22d by a control signal therefrom. To move the picture down requires the modified scheme of setting the addresses to a value greater than 0. For example, to move the picture down 10 horizontal lines would require setting the vertical write address generator or counter 22f to 10 on line 15. This may be provided by vertical address encoder 52 in FIG. 4 with switch 51 in the "N" position. The encoder 52 is normally out of the system with a switch 52a in the R or position to always reset the generator 22f in the "O" address position. When switch 52a is in the encoder 52 position, the preset address of encoder 52 or 10 for the example is applied to write vertical address generator 22f and the picture when read normally moves down 10 lines.

To move the picture to the left on the output monitor involves a similar process to that for raising the picture. For instance, to move the picture to the left by 192 addresses (representing one quarter the width of the picture), the horizontal address counter is set to 0, exactly 192 clock pulses after horizontal blanking has terminated.

To accomplish this delay, an alternate start address decoder 53 is coupled via switch 54—switched from the "N" to the "M" or modified position—between counter 22a and horizontal write address generator (a counter) 22c. The alternate start address decoder 53 for the above example (to move the picture one-quarter width to the left) would count to 192 clock pulses after horizontal blanking before applying the "start" signal via switch 54 at position M to horizontal write address generator 22c. The horizontal write address generator 22c is inhibited until receipt of the "start" from either decoder 22b or alternate decoder 53. Also, there is no write control pulse from AND gate 22h until there is a receipt of the "start" signal to flip-flop 22j. The first 192 samples of each line would be omitted from the memory with the 192nd sample being at left with horizontal address of "0". It is assumed in the above that the horizontal write address generator 22c is reset to address "0" at the start by a switch 55a being in the R or initial zero address position. To move the picture to the right involves a similar process to that for lowering the picture in that the addresses to the horizontal write address counter 22c are preset by an encoder 55. To move the picture in the example by one-quarter of the raster width to the right would require presetting the horizontal address generator 22c to 191 by encoder 55 via switch 55a in the encoder 55 position (as shown) and switch 54 in the "N" position. At the termination of horizontal blanking, the left edge of the picture is stored with the horizontal address 191. When read out normally the video would appear beginning 192 spaces to the right of the normal left edge.

Obviously, both the vertical and horizontal addresses could be modified simultaneously moving the picture diagonally off the screen.

Figure 5:
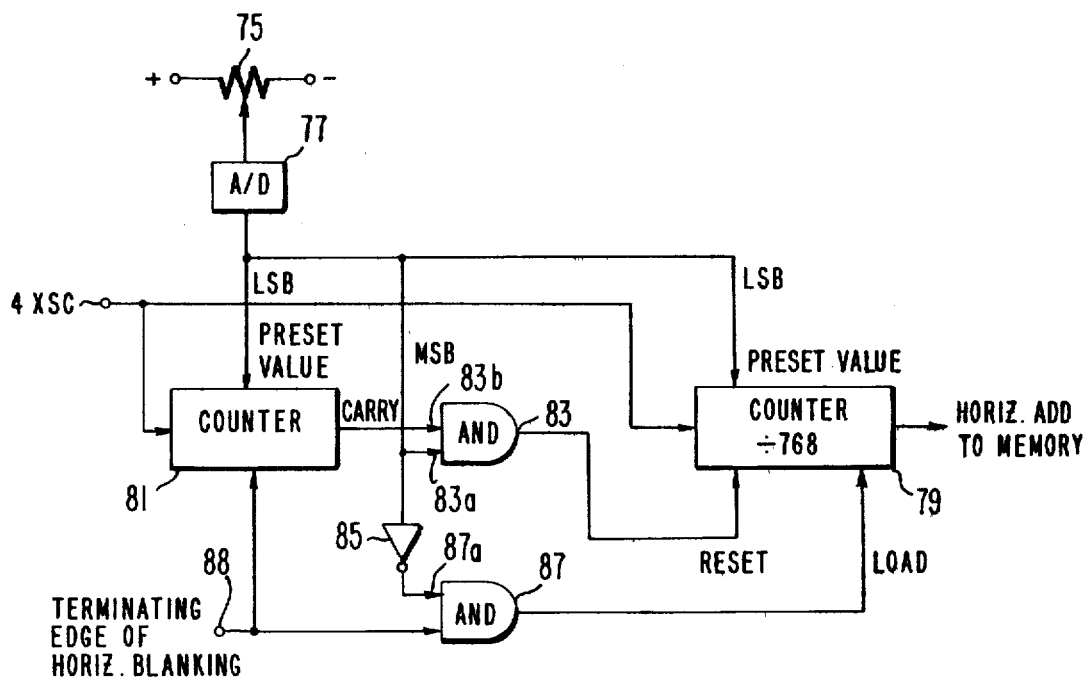
FIG. 5 is a block diagram of a system for moving the picture right to left in an alternative embodiment.

One of the possible methods that could be used to provide this control over the synchronizer write addresses is to use a joystick calibrated in such a way that an analog output is converted to a digital output of all zeros when the joystick is centered and it is desired that the picture be centered. The output of the joystick circuitry is a two's complement binary code with separate horizontal and vertical data. As the joystick is moved to the right, the digital data is the addresses to which the horizontal address counter is set at the termination of horizontal blanking and the vertical address counter is set on line 15. As the joystick is moved to the left or up, the addresses would go from all zeros to all ones and decrease from these values. The fact that the MSB (most significant bit) of this data has become a 1 is an indication that there needs to be a delay of as many clock pulses, or lines, as the data dictates before the address counters are set to zero. One way of controlling this portion of the circuitry is to set a counter to the value dictated by the joystick data, incrementing the counters on every clock pulse, or line, until said counters overflow, thus indicating the time the address counters are to be set to zero. FIG. 5 is a block diagram of the horizontal portion of a circuit as described above. A potentiometer 75 is used to generate a voltage that indicates where the picture should begin. The arrow indicates the position of the joystick. The analog output of the potentiometer 75 is converted to a digital signal by an analog to digital converter 77 calibrated such that 0 volts in produces 0 code output. As the joystick is moved to the right the LSB's (least significant bits) from the A/D converter 77 are used to preset the write address counter 79 at the terminating edge of horizontal blanking. The MSB bit from converter 77 is a logic zero and this logic zero is applied to terminal 83a of AND gate 83 inhibiting any reset to horizontal write address counter 79. By the inverter 85, a logic 1 or high is at terminal 87a of AND gate 87. A second high or a logic 1 level exists after the terminating edge of horizontal blanking in the input signal from terminal 88. (9μ sec after leading edge of horizontal sync). This causes write address counter 79 to write or load into the memory the incoming video samples beginning with the preset video address. If that address is normally for the 192nd sample, the video when read out is displaced one-quarter of the width of the raster to the right. If the joystick is moved to the left, the MSB becomes a logic 1 causing logic 1 at terminal 83a of AND gate 83. Counter 81 is preset to a value indicated by the LSB's from the A/D converter 77. After the number of counts equals the full count minus the preset count, counter 81 provides a carry to terminal 83b of AND gate 83 causing the write address counter 79 to be reset to 0. Counter 81 begins to count at the termination of the horizontal blanking signal (indicated terminating edge of horizontal blanking) at terminal 88. No signal is provided out of AND gate 87 due to the inhibit low at terminal 87a. The write address counter 79 then starts with address "0" and is incremented by each clock pulse after the predetermined delay provided by counter 81 which is determined by the preset value (LSB value). The system of FIG. 5 could be switched across the counter 22a, decoder 22b and write address 22c in FIG. 4 when it is desired to move the picture either to the right or to the left. The vertical circuitry could be incorporated in a similar manner. In the vertical case, when the potentiometer was moved up and down the MSB would be a logic 1 to be raised and a logic 0 to be lowered. When the picture is to be raised, the time at which video is to appear at the top is preset in the first counter (counter 81 in FIG. 5) and when it is to be lowered, the LSB presets the write address counter so that at the terminating edge of vertical blanking the first line of active video is provided with a preset line address of a line value greater than line 10 for example. Other methods could be used to exert similar control over the write addresses. For example, switches could be used to preset specific codes.

Figure 6:
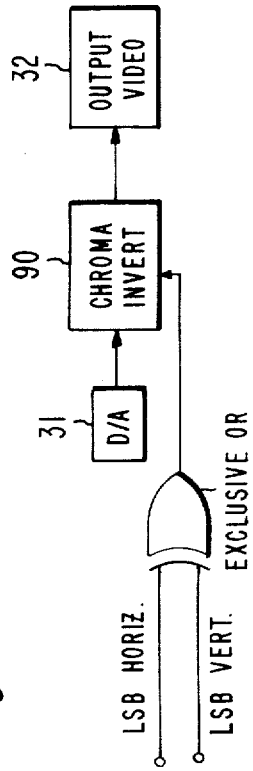
FIG. 6 is a block diagram of a system for inverting the chrominance.

In the above described arrangement it has been assumed that the picture is moved in increments of four samples horizontally (full subcarrier cycles) and two lines vertically. It is recognized that the picture may be moved in half cycle increments horizontally and one line increments vertically if means is provided to invert the chrominance. For example, referring to FIG. 6 between the D/A converter 31 and output video 32 in FIG. 1 may be a chroma inverter 90. The LSB from the A/D converter 77 in FIG. 5 and the like LSB from the vertical A/D converter are applied to an exclusive OR 91. The high at the output of the exclusive OR turns "on" the chroma inverter.

If one input to the exclusive OR 91 is high and other is not—indicating an odd number of pair of samples or half subcarrier cycles shifted and an even number of lines maintained or moved or an odd number of lines moved and an even number of pair of samples shifted or maintained—a signal is provided from the exclusive OR 90 to the chroma inverter 90 located between the D/A converter 31 and output video 32 for inverting the chroma only. It is recognized that in the case of a digital chroma inverter the chroma inverter would be located prior to the D/A converter 31 and may even be prior to the memory 20.

By applying the output from the video synchronizer to a conventional video switcher and generating a key signal in the synchronizer indicating the location of the picture in the raster, the video switcher can be used to provide a background signal over the areas not occupied by the picture from the synchronizer. The background may be, for example, another picture.

This television positioning apparatus may be used with a television picture compressor such as that described by Thomas M. Gurley in copending application filed concurrently herewith entitled "Television Picture Compressor", Ser. No. 862,180. (British Provisional filed Mar. 21, 1977 and given No. 11904/77). Also this may be used with the size altering apparatus of Hurst (cited previously) filed Dec. 27, 1976, U.S. Pat. No. 4,134,128 "Television Picture Size Altering Apparatus". In accordance with the combination of compressor apparatus, the combined apparatus will permit the positioning of the compressed picture in any desired location by adjusting the addresses of the compressed picture as it is stored in the memory. In the case of ¼ size compression this compressed picture may be moved to any position on or off the raster. Also, four different rasters could be compressed with the addresses from the picture positioning apparatus being such that the four compressed pictures are in the four quadrants of a full raster so that when the whole memory is read they may be displayed simultaneously.

Although the present invention has been described in terms of a composite video signal according to the NTSC television standards, the principles of the invention are equally applicable to other television standards as PAL, PAL-M, and SECAM. These other standards do contain differences from the NTSC system which require modification to the portions of the synchronizer and the compressor. Among these are—the clock frequencies which must be adjusted for differences in subcarrier frequency which determines the number of samples per line, i.e., 4.43 MHz in PAL vs. 3.58 MHz in NTSC system. Similarly, the capacity of the memory in terms of lines stored must be adjusted to accommodate the number of vertical lines in each system, typically, 625 in PAL, 525 in PAL-M and 625 in SECAM. In addition, the memory organization and controlling logic must be adjusted to the individual color signal differences in each system such as eight unique fields in PAL in terms of burst phase sequence against only four unique fields in terms of the NTSC burst phase sequence, while in SECAM the burst frequency in the form of an undeviated subcarrier alternates on each line but is of a different frequency on each line. The horizontal and vertical synchronizing signals of each television system must also be accommodated in generating the write addresses for writing into the memory and generating the read addresses for reading out of the memory.

What is claimed is:

1. A television picture positioning apparatus for use with a television video synchronizer of the type including an address generator responsive to input composite television signals for sampling the active video at a given rate and storing the active video samples in non-varying locations of a memory according to predetermined addresses from the address generator and for detecting sync timing, said address generator providing addresses at said given rate and being started a predetermined time following detected sync timing; and means responsive to the stored samples for providing a video like that of the incoming video, said apparatus comprising:

means coupled to said address generator for delaying the start of the address generator in accordance with a selected time period following the horizontal blanking to move the picture to the left, and means for presetting the address generator at a selected address of a higher value or a value which normally stores active picture samples to the right of the raster to move the picture to the right.

2. The combination of claim 1 including means for moving the picture up and down comprising means coupled to said address generator for delaying the start of the memory address generator in accordance with a selected time period following the vertical sync pulses to move the picture up, and means coupled to said address generator for presetting the address generator at a higher line value or the address value of the line below the normal line address to move the picture down.

3. A method for moving pictures on the displayed output of a video synchronizer of the type including an address generator responsive to input composite television signals for detecting sync timing sampling the video and storing the samples in nonvarying locations in a memory according to predetermined addresses from the address generator, said addresses occurring at a given sampling rate and beginning a given time following sync timing; and means responsive to the stored samples for providing a video like that of the incoming video, comprising the steps of:

(a) sensing the termination of sync pulses, (b) delaying the start of the address generator by a preselected time period following the sync pulses for moving the picture to the left or up, and (c) presetting the address generator at a selected address of a higher value or a value which normally stores active pictures to the right or down on the raster for moving the picture to the right or down.

4. A method for moving pictures on the displayed output of a video synchronizer of the type including an address generator responsive to input composite television signals detecting sync timing and for sampling the video and storing the samples in nonvarying locations in a memory according to predetermined addresses from the address generator, said addresses occurring at the sampling rate and beginning a given time following sync, and means responsive to the stored samples for providing a video like that of the incoming video, comprising the steps of:

(a) sensing the termination of horizontal blanking and vertical sync pulses, (b) delaying the start of the address generator for a selected time period following the horizontal blanking for moving the picture to the left, (c) delaying the start of the memory address generator for a preselected time following the vertical sync pulses for moving the picture up, (d) presetting the memory address generator at a selected address of a higher value or value which normally stores the active picture sample to the right of the raster, when sensing the termination of the horizontal blanking for moving the picture to the right.

(e) presetting the memory address generator at a selected line address of a higher value or a value which normally stores active picture lines below the normal reference line.

5. A television picture positioning apparatus for use with a television video synchronizer of the type including an address generator and responsive to composite television signals including active video signals and sync timing for sampling same at a given rate and storing the active video samples in nonvarying locations of a memory according to predetermined addresses from the generator, said address generator providing addresses at said given rate and being started a fixed time period following sync timing; and means responsive to the stored samples for providing a video like that of the incoming video, said apparatus comprising:

a manual control, means coupled to said manual control for generating a code representing the selected position of a television picture, means coupled to said address generator and responsive to said code being in one state for inhibiting addresses to the memory in accordance with a period of time following said fixed time as determined by the code following sync timing to move the picture in one directional sense, means coupled to said generator responsive to said code being in a second state for presetting the address in the address generator to a value normally associated with the storage of picture samples at the right of the raster to thereby cause the picture to be moved in a directional sense opposite said one sense.

6. A television picture positioning apparatus for use with a television video synchronizer of the type including an address generator responsive to composite television signals including active video signals and sync timing for sampling same at a given rate and storing the active video samples in nonvarying locations of the memory according to predetermined addresses from the generator, said generator providing addresses at said given rate and started a fixed time period following sync timing; and means responsive to the stored samples for providing a video like that of the incoming video, said apparatus comprising:

a manual control, means responsive to the position of the manual control for generating a digital code representing the selected position of a television picture with the first digit of the code indicating whether or not the picture is moved to the left or to the right, means coupled to said generator and responsive to the first digit of the code being in one binary state for inhibiting the addresses to the memory for a predetermined period of time following said fixed time following sync timing, means coupled to said generator and responsive to the first digit being of the other binary state for presetting the address to the generator to a value normally associated with the storage of samples at the right of the raster, means coupled to said inhibiting means including a counter responsive to the other digits in the code when the first digit is in the one state for presetting the delay for inhibiting addresses, and means coupled to said generator responsive to the other digits of the code when the first digit is of the other state for presetting the addresses in the address generator.

7. The combination of claim 6 wherein the counter is a selectable counter responsive to a digital code.

8. The combination of claim 6 wherein said address generator is of the type being capable of being set by a digital code.

* * * * *